(12) United States Patent
Tateishi

(10) Patent No.: US 7,006,476 B1
(45) Date of Patent: Feb. 28, 2006

(54) COMMUNICATION APPARATUS AND COMMUNICATION RATE SELECTING METHOD THEREOF

(75) Inventor: Toru Tateishi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/400,281

(22) Filed: Sep. 21, 1999

(30) Foreign Application Priority Data

Sep. 21, 1998 (JP) .................................. 10-266858

(51) Int. Cl.
*H04B 7/212* (2006.01)

(52) U.S. Cl. .................... 370/337; 370/437; 370/468

(58) Field of Classification Search ............... 370/329, 370/338, 341, 348, 431, 468, 465, 437, 278, 370/337, 347, 282; 455/450, 464, 516
See application file for complete search history.

(56) References Cited

U.S. PATENT DOCUMENTS

| | | | | |
|---|---|---|---|---|
| 5,117,423 A | * | 5/1992 | Shepherd et al. ........... | 370/280 |
| 5,212,684 A | * | 5/1993 | MacNamee et al. | |
| 5,231,649 A | * | 7/1993 | Duncanson | |
| 5,276,686 A | * | 1/1994 | Ito .............................. | 370/330 |
| 5,392,284 A | * | 2/1995 | Sugiyama | |
| 5,490,136 A | * | 2/1996 | Sereno et al. ................ | 370/348 |
| 5,511,074 A | * | 4/1996 | Lam et al. ................... | 370/465 |
| 5,519,702 A | * | 5/1996 | Takahashi | |
| 5,564,072 A | * | 10/1996 | Garcia Aguilera et al. . | 370/337 |
| 5,592,469 A | * | 1/1997 | Szabo | |
| 5,697,059 A | * | 12/1997 | Carney ........................ | 455/509 |
| 5,712,624 A | * | 1/1998 | Ayerst et al. | |
| 5,729,532 A | * | 3/1998 | Bales et al. | |
| 5,764,644 A | * | 6/1998 | Miska et al. | |
| 5,859,840 A | * | 1/1999 | Tiedemann, Jr. et al. | |
| 5,914,950 A | * | 6/1999 | Tiedemann et al. ......... | 370/348 |
| 5,974,106 A | * | 10/1999 | Dupont et al. | |
| 6,031,832 A | * | 2/2000 | Turina ........................ | 370/348 |
| 6,085,089 A | * | 7/2000 | Emmer et al. ............... | 455/439 |
| 6,108,560 A | * | 8/2000 | Navaro et al. ............... | 455/517 |
| 6,130,879 A | * | 10/2000 | Liu ............................. | 370/230 |
| 6,202,094 B1 | * | 3/2001 | Grosser, Jr. et al. | |

(Continued)

FOREIGN PATENT DOCUMENTS

JP      08-130587      5/1996

*Primary Examiner*—Chau Nguyen
*Assistant Examiner*—Steven Blount
(74) *Attorney, Agent, or Firm*—Finnegan, Henderson, Farabow, Garrett & Dunner, L.L.P.

(57) ABSTRACT

A communication apparatus is provided, which is capable of selecting the communication rate at high speeds with increased reliability along with a communication rate selecting method for use therein. An TCH number in this station detecting means 21 is provided for detecting a number of TCH to be assigned by a base station. An detected TCH number notify control means 22 is operatively responsive to receipt of the TCH number as detected by the TCH number in this station detecting means 21 for notifying it to a connected station under communication. An TCH number in connected station detecting means 23 is operable to monitor a received signal from the communication with connected station for detection of a TCH number as presently assigned thereto by the base station. A communication rate request/instruction reception means 24 is for receiving a communication rate switching request from a user via a key input unit 30. A communication rate switching control means 25 performs a communication rate switching control operation in accordance with the TCH number detected by the TCH number in this station detecting means 21 and the TCH number detected by the TCH number in connected station detecting means 23 as well as the communication rate switching request from the user.

33 Claims, 7 Drawing Sheets

U.S. PATENT DOCUMENTS 6,301,265 B1 * 10/2001 Kleider et al. ............... 370/465
6,307,836 B1 * 10/2001 Jones et al.
6,347,091 B1 *  2/2002 Wallentin et al.
6,480,585 B1 * 11/2002 Johnston ................. 379/100.17
6,775,241 B1 *  8/2004 Levin ......................... 370/252
6,888,794 B1 *  5/2005 Jovanovic et al. .......... 370/230

* cited by examiner

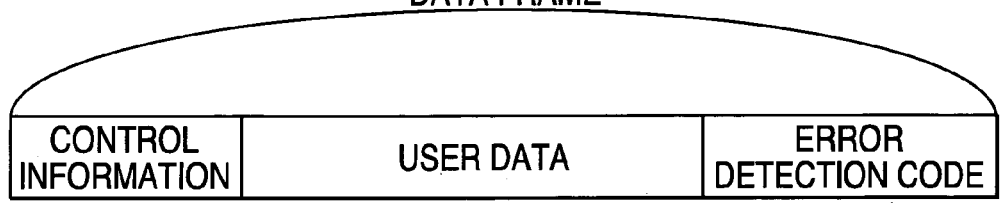
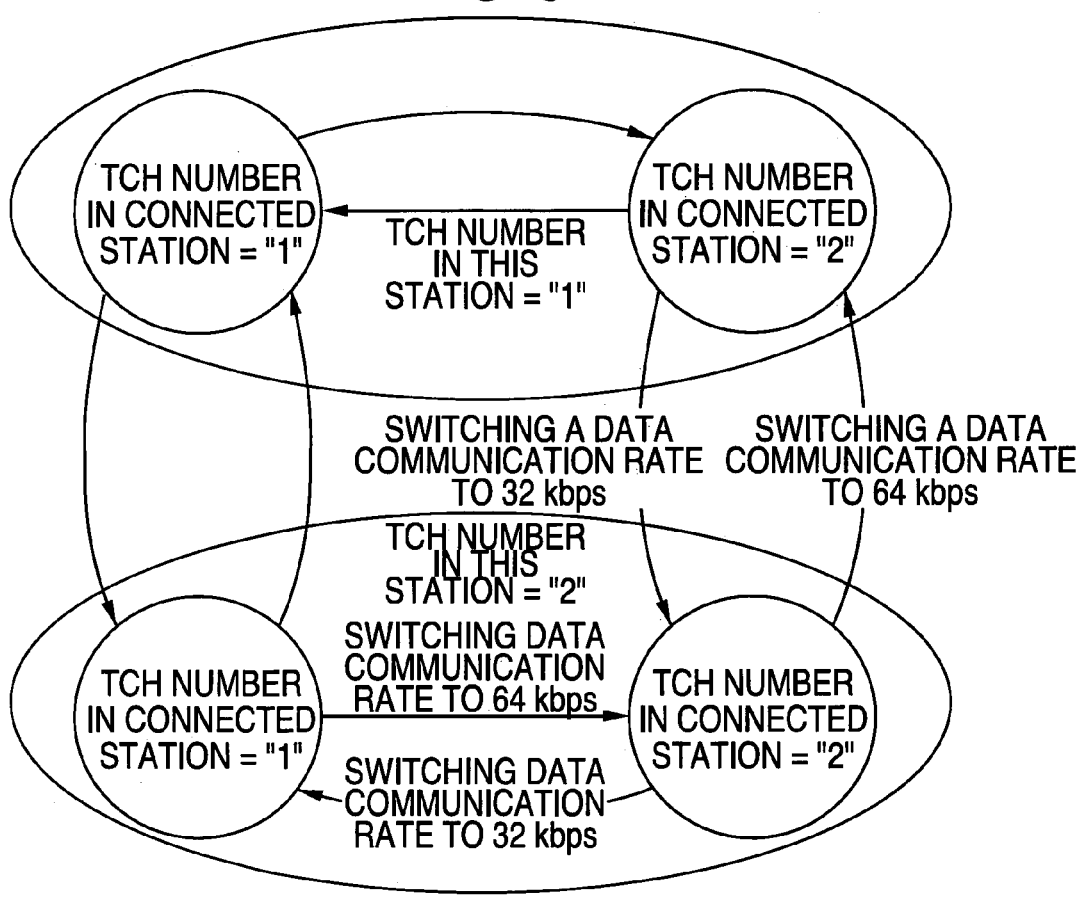

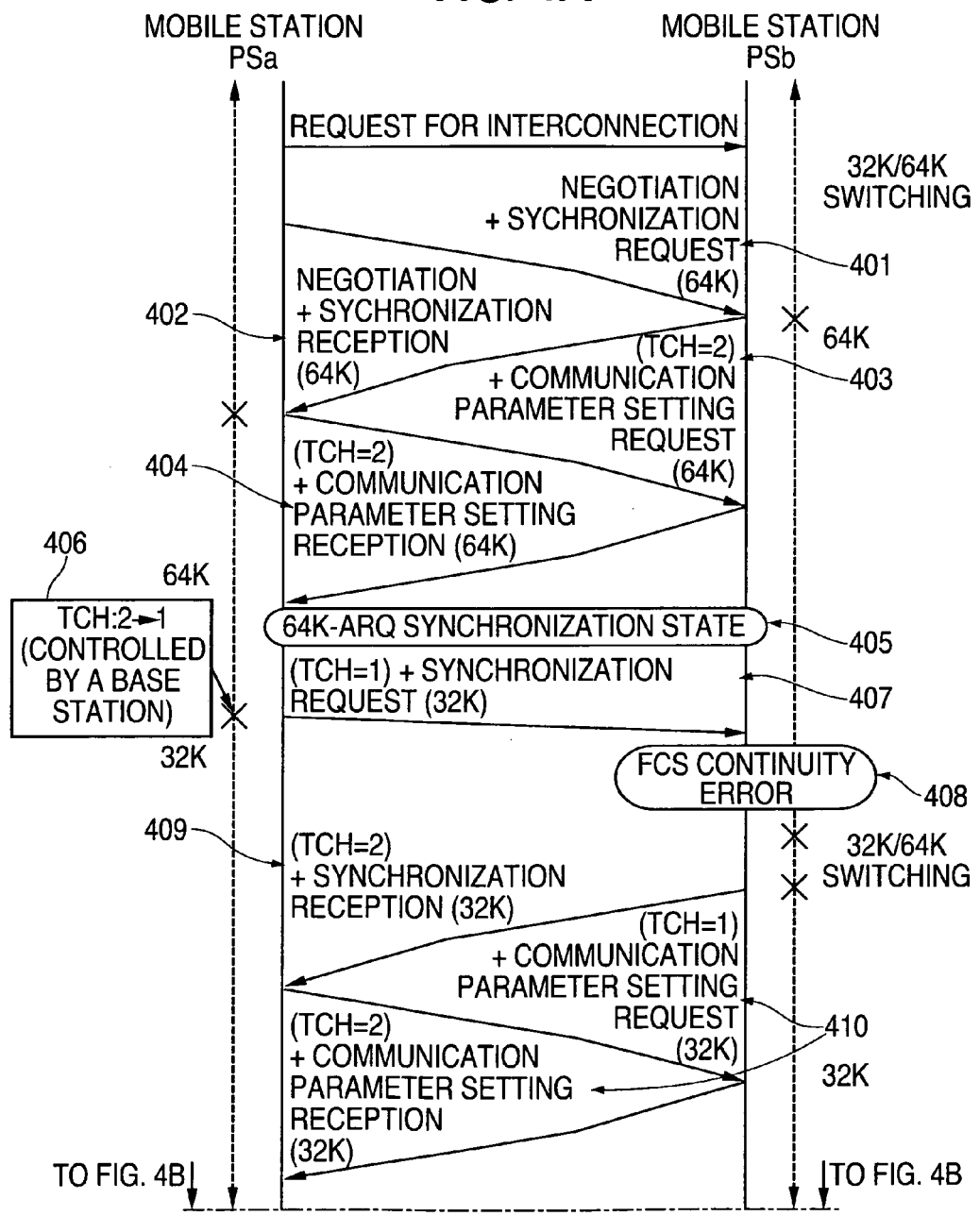

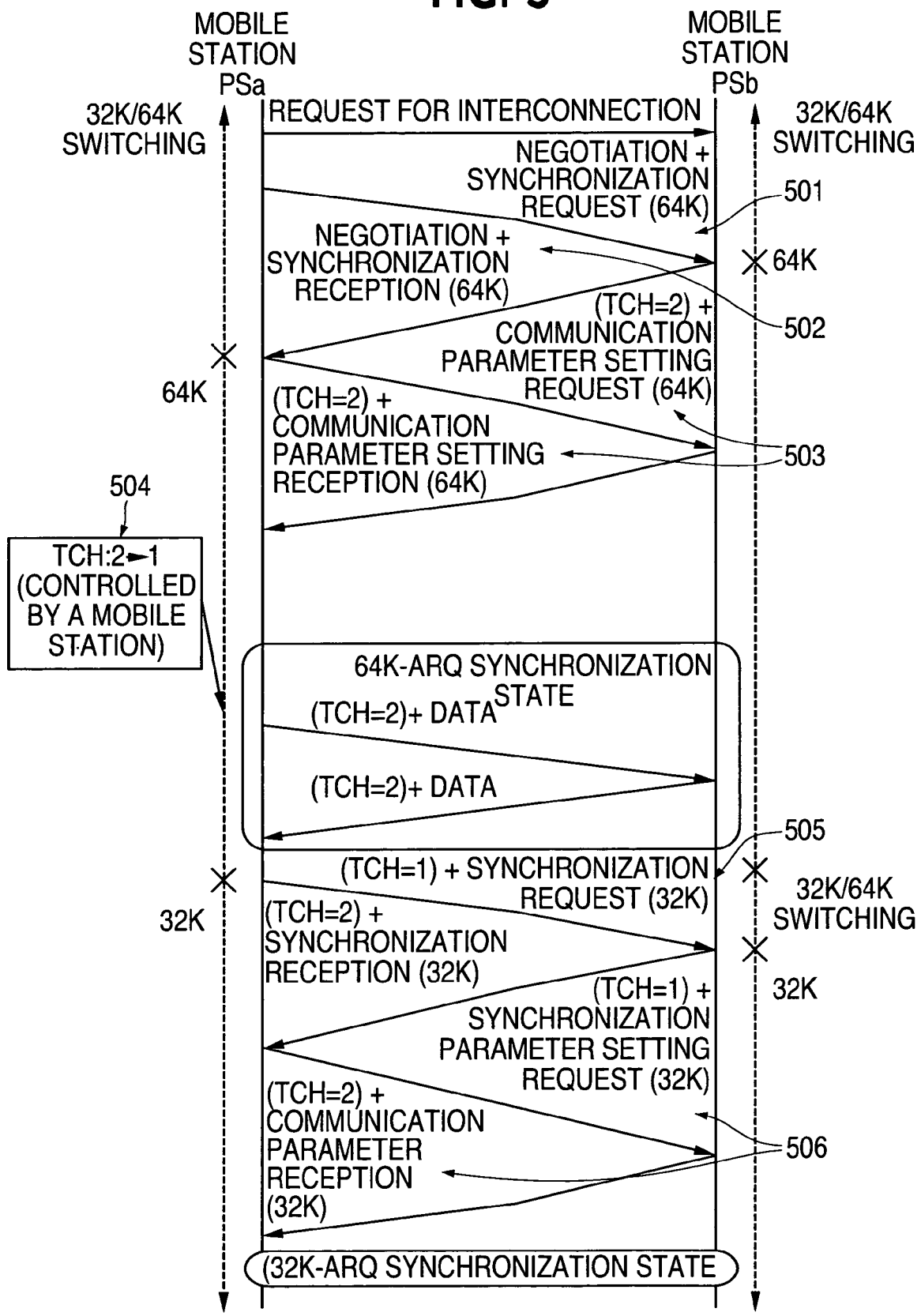

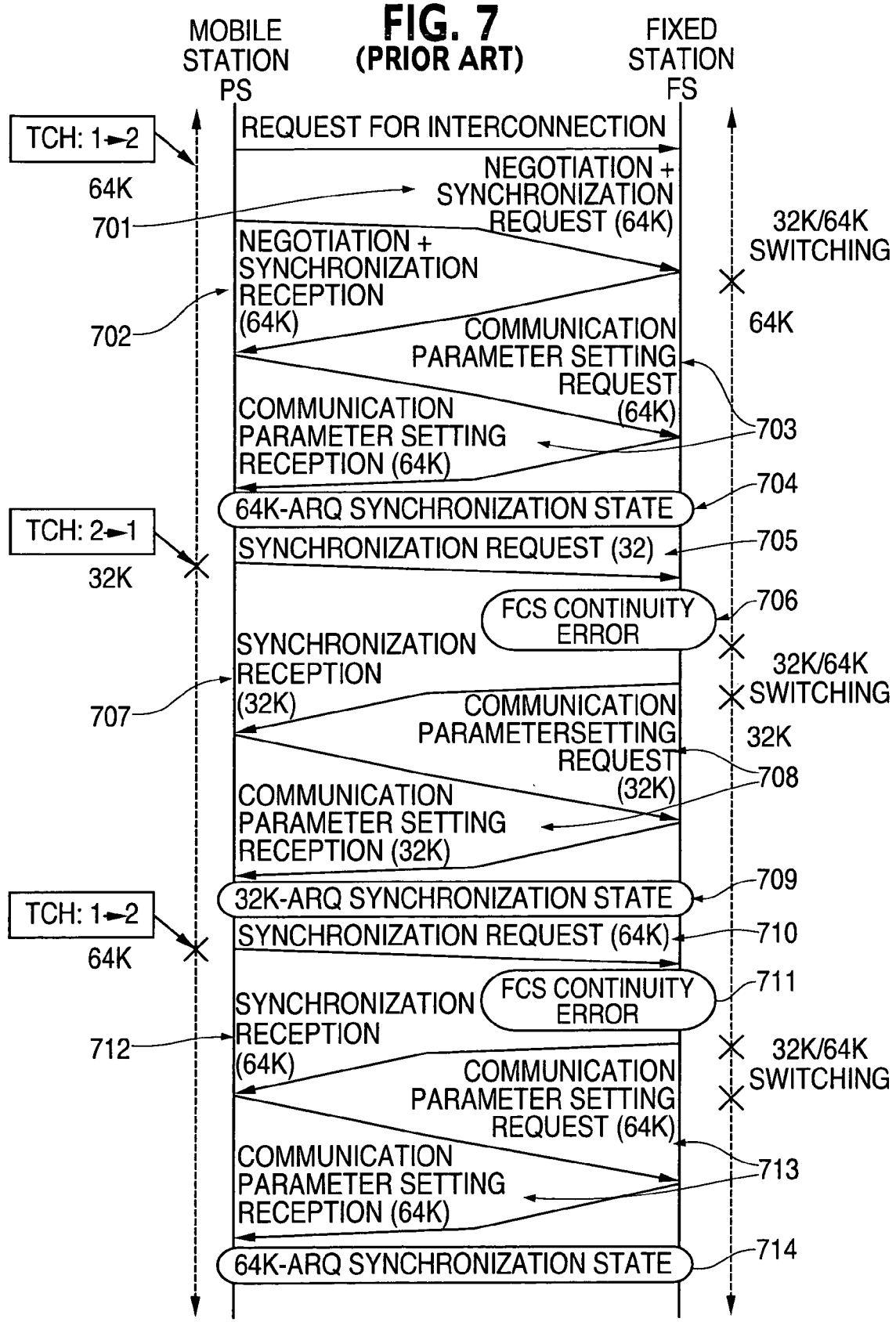

COMMUNICATION APPARATUS AND COMMUNICATION RATE SELECTING METHOD THEREOF

BACKGROUND OF THE INVENTION

1. Field of the Invention

This invention relates generally to telecommunications systems and, more particularly, to communication apparatus for use in such systems capable of performing data communications at variable communication rates.

2. Description of the Related Art

Currently available mobile radio communications systems include, but not limited to, personal digital cellular (PDC) systems and personal handyphone systems (PHS). In recent years, digitalization has been applied to access schemes for providing access between mobile stations and base stations in such communications systems. This permits the systems to achieve high-speed data communications as well as traditional speech-based or voice telecommunications services.

Telecommunications systems of earlier generations employing as such digital access scheme the time division multiple access (TDMA) technique have been typically designed to perform data communication with a single time slot assigned in a data communication event on a per-event basis. As a need is felt to speed up communication services in recent years, attempts are made to assign multiple time slots to one data communication event.

Regrettably the speed-up approach is encountered with a problem which follows.

A single user exclusively owns or "monopolizes" a plurality of times slots that are limited in number at a base station, which would badly affect other users' communications resulting in a decrease in their useable slot number. This is a bar to retainment of the equity in public communications services.

On the contrary, unconditionally limiting the number of usable time slots during data communication to one per user would result in a decrease in data transfer speed or rate while reducing the use efficiency of system resources due to an increase in number of non-use or "idle" time slots where other users are absent.

One prior known way of solving these conflicting problems is to employ variable time-slot number control techniques, which are for controlling the number of time slots being assigned to a certain user who presently requests high-speed data communication services so that the slot number varies even during communication in accordance with the number of idle time slots at a base station.

Here, an explanation will be given of an event of data communication between a mobile station PSa of PHS and a fixed station FS on the integrated services digital network (ISDN) via a base station CSa as shown in FIG. 6.

FIG. 7 is a diagram showing an operational sequence thereof. Note that in this drawing, the base station CSa is eliminated. Also note that the term "negotiation" as used in FIG. 7 refers to negotiation information.

As well known to those skilled in the art, the PHS architecture offers capability of data communications at a rate of 32 kilobits per second (Kbp) by use of a single TCH which corresponds to the time slot discussed above. The PHS is capable of providing data communication services at 64 Kbps by using a combination or "bundle" of two separate TCHs together. TCH means a time slot channel or a message channel.

Firstly, the mobile station PSa issues to the fixed station FS via the base station CSa a request for interconnection for communication with its destination or target party; then, a communication link is established. Assume in this event that the base station CSa has two idle TCHs, which are assigned by the base station CSa to the "calling" mobile station PSa.

In response to the TCH allocation the mobile station PSa transmits to the fixed station FS a data frame containing therein both negotiation information and specific information indicative of a request for establishment of synchronization of 64-Kbps data communication in a way that complies with the synchronization establishment procedure under a selected data communication protocol (negotiation+synchronization request [64K] 701).

A typical structure of the data frame is shown in FIG. 2, wherein this frame consists essentially of a control information region, user data region, and error detection code region. The control information region is for storage of several data items, including a sequence number for use during re-send controlling operations, effective data length of the user data region, frame type (identifying whether the frame of interest is for use in setting synchronization or in exchanging parameters), and others.

On the other hand the fixed station FS waits for arrival of the data frame as sent from the mobile station PSa in accordance with the data communication protocol's synchronization establishment procedure while alternately changing or switching the data transfer rate between 64 Kbps and 32 Kbps because of the fact that the fixed station FS is not aware of which of the transmitting rates is presently used for the data frame to arrive at the fixed station FS.

After elapse of certain time, the fixed station FS may receive the data frame. Upon receipt of this frame, the fixed station FS transmits, as a response to the 64-Kbps data communication service request contained in this data frame, information that indicates the acceptability of such request toward the mobile station PSa along with negotiation information (negotiation synchronization reception [64K] 702).

Thereafter, the mobile station PSa and fixed station FS exchange communication parameters therebetween (communication parameter setting request [64K], communication parameter setting reception [64K] 703); then, 64-Kbps data communication including "error re-send" procedure (known as 64K-ARQ data communication) gets started (64K_ARQ Synchronization State 704). ARQ means automatic request for repetition.

As time elapsed, a new communication request is issued by a third party to the base station CSa. When this is done, the base station CSa acts to adjust the TCH allocation number with respect to the mobile station PSa so that it decreases to one (1) (synchronization request [32K] 705). In responding thereto, the mobile station PSa newly transmits toward the fixed station FS via the base station CSa an updated data frame that contains therein information indicative of a request for establishment of synchronization of 32-Kbps data communication.

In such event the fixed station FS must experience failure of synchronization due to the fact that the rate of transmission of the data frame from the mobile station PSa has been switched to 32 Kbps, which would result in creation of an FCS continuity error (706). In case this error continues for a predetermined time period or longer, the fixed station FS operates to switch the communication rate to 32 Kpbs for receipt of an incoming data frame.

Whereby, the fixed station FS receives the 32-Kbps data communication synchronization establishing request from the mobile station PSa; then, it sends a burst of information to the mobile station PSa as a response to this request, which information indicates the acceptability of the 32-Kbps data communication request (synchronization reception [32K] 707).

Thereafter, the mobile station PSa and fixed station FS exchange communication parameters therebetween (communication parameter setting request [64K], communication parameter setting reception [64K] 708), and then initiate the intended 32-Kbps data communication including error resend procedure (known as 32K-ARQ data communication) (32K ARQ synchronization state 709).

Upon termination of the third party's communication service, an idle TCH occurs at the base station CSa; at this time, the base station CSa increases the number of usable TCHs allocated to the mobile station PSa up to two (2). In responding, the mobile station PSa again passes a data frame to the fixed station FS by a way of the base station CSa, which frame includes information indicative of a 64-Kbps data communication synchronization establishment request (synchronization request [64K] 710).

When this is done, the fixed station FS experiences failure of synchronization due to the fact that the rate of transmission from the mobile station PSa has been switched to 64 Kbps, which can result in occurrence of an FCS continuity error (711).

In case this error continues for more than a predetermined time interval, the fixed station FS behaves to switch the communication rate up to 64 Kpbs for receipt of the 64-Kbps data communication synchronization establishment request from the mobile station Psa; then, it sends to the mobile station PSa the information indicating that the 64-Kbps data communication request is acceptable (synchronization reception [64K] 712).

Thereafter, the mobile station PSa and fixed station FS exchange communication parameters therebetween (communication parameter setting request [64K], communication parameter setting reception [64K] 713), letting the 64-Kbps data communication including "error re-send" procedure (known as 64K-ARQ data communication)(64K_ARQ Synchronization state 714) get started again.

However, in case the destination or associative party of the mobile station PSa under data communication is a mobile station PSb via a base station CSb as shown in FIG. 6, when any one of the mobile station PSa and mobile station PSb increases in number of TCHs as presently allocated thereto, the mobile station with such updated TCH number attempts unilaterally to make a request for synchronization establishment of the communication rate pursuant to such new assignment number. In this case, if the remaining mobile station is incapable of operating at the updated communication rate due to its shortage of TCHs being presently assigned thereto, then the above-noted synchronization establishment request becomes invalid forcing it to again perform the communication rate synchronization establishment control that has been executed prior to issuance of the request, which can result in waste of time.

Another problem faced with the related art approach is that certain non-negligible time must be consumed every time when switching the communication rate because of the fact that currently available mobile stations are inherently designed to reject entry of any other communication rate synchronization establishment requests before an FCS continuity error actually has continued for a prespecified length of time period.

In related art telecommunications systems including PHS services, these suffer from an extensive increase in requisite processing time whenever the communication rate is to be changed. In addition, the related art systems are encountered with another problem that a caller's terminal can fail to newly establish its intended synchronization during communication with its target or associated party's terminal depending upon circumstances at the party, which in turn leads to risks of recurrent execution of unnecessary control routines.

SUMMARY OF THE INVENTION

This invention has been made to avoid the problems faced with the related art, and its primary object is to provide an improved communication apparatus capable of quickly switching the communication rate with increased accuracy and reliability, along with communication rate switching methodology for use therein.

To attain the above objective, this invention provides an improved communication apparatus for communicating over a plurality of channels at a time and changing a communication rate on the base of a number of the channels, comprising, notifying means for notifying a connected communication apparatus of a number of channels usable at the apparatus, detecting means for detecting through communication with the connected communication apparatus a number of channels useable at the connected communication apparatus and selecting means for selecting a communication rate on the basis of the notified number of channels and the detected number of channels.

The communication apparatus incorporating the principles of this invention is arranged to control the communication rate so that this rate is variable in accordance with the number of channels useable at the the communication apparatus and also with the number of channels available in connected communication apparatus.

Accordingly, with the communication apparatus thus arranged, its communication rate selecting or change-over operations may be carried out at increased speeds with the accuracy and reliability maximized. This can be said because the communication rate selecting is done while fully taking into consideration the actual number of present "idle" channels usable at the connected communication apparatus.

To achieve the foregoing object this invention also provides a method for selecting a communication rate of a communication apparatus for communicating over a plurality of channels at a time and changing a communication rate on the base of a number of the channels, comprising, notifying a connected communication apparatus of a number of channels usable at the apparatus, detecting through communication with the connected communication apparatus a number of channels useable at the connected communication apparatus, and selecting a communication rate on the basis of the notified number of channels and the detected number of channels.

The communication rate selecting method of the communication apparatus arranged as stated above is designed to control the communication rate so that it is variable in accordance with the number of channels useable at the communication apparatus and also with the number of channels useable at the connected communication apparatus.

Accordingly, with the communication rate seleceting method for the communication apparatus thus arranged, its communication rate selecting or change-over operations may be carried out at increased speeds with the accuracy and reliability maximized. This can be said because the communication rate selecting is done while fully taking into consideration the actual number of present "idle" channels presently usable at the connected communication apparatus.

It is thus possible for the communication rate selecting method of the communication apparatus in accordance with this invention to increase the channel use efficiency due to the fact that an attempt is made to determine whether a communication rate selecting operation is done whenever the connected communication apparatus's usable number of the channels changes on a real time basis.

BRIEF DESCRIPTION OF THE DRAWINGS

FIG. 2 is a diagram showing a structure of one data frame that the communication apparatus shown in FIG. 1 sends to or receives from its associative connected terminal.

FIG. 3 is a diagram pictorially representing a relation of assigned channels at calling and called party's terminals during communication therebetween, for explanation of a communication rate switching control scheme using a communication rate switching controller of the communication apparatus of FIG. 1.

FIGS. 4A and 4B are an operational sequence diagram for explanation of a data communication rate switching control operation of the communication apparatus of FIG. 1 in response to a request from a base station site.

FIG. 5 is a sequence diagram for explanation of a data communication rate switching control operation of the communication apparatus of FIG. 1 in reply to a user's request.

FIG. 7 is a sequence diagram for explanation of a data communication rate switching control operation of one typical related art communication apparatus.

DESCRIPTION OF THE PREFERRED EMBODIMENTS

One preferred embodiment of this invention will now be explained with reference to the accompanying drawings.

Figure 1:
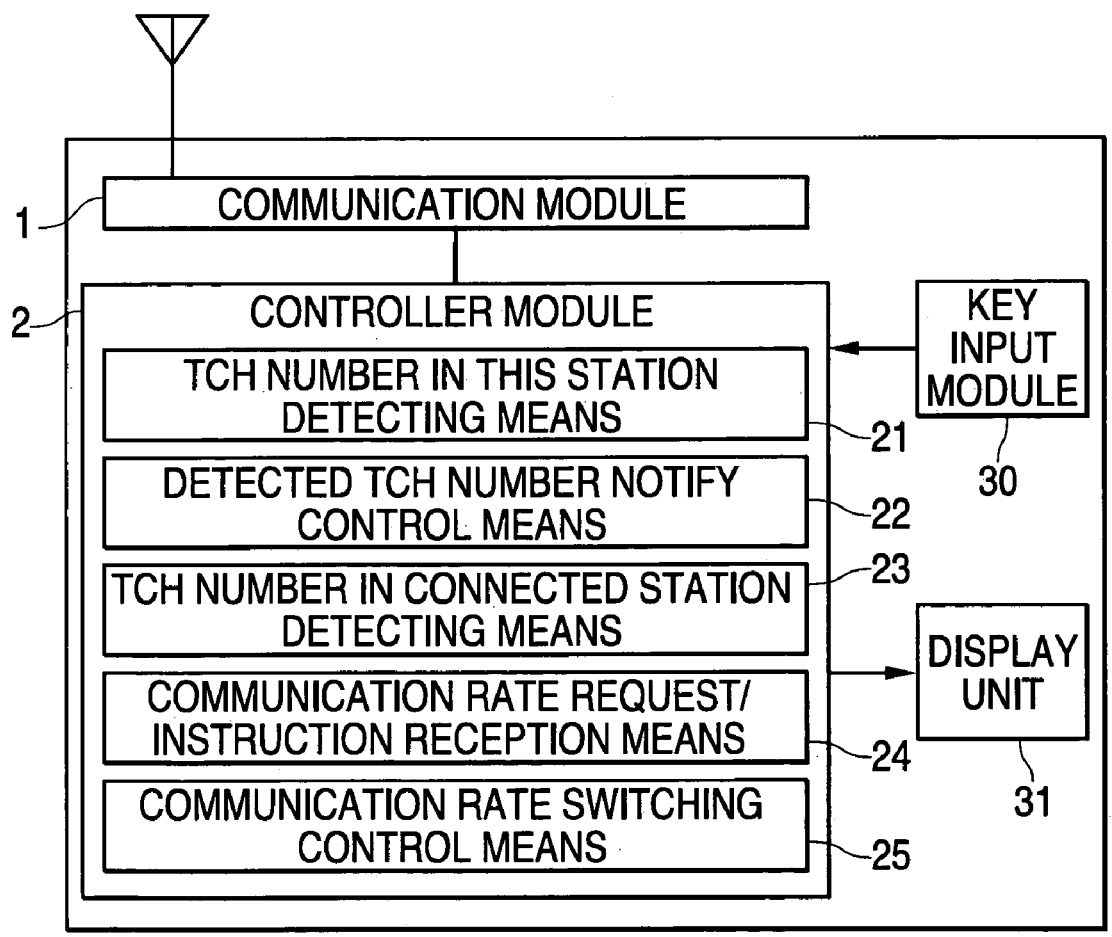
FIG. 1 is a diagram showing in circuit block form a configuration of a communication apparatus in accordance with one embodiment of this invention.

FIG. 1 illustrates a configuration of a communication apparatus in accordance with one embodiment of this invention, which is a mobile communication station-here, a portable communication transceiver or cordless radiotelephone unit such as a PHS handset, by way of example.

This mobile station is generally configured from a communication module 10 and controller module 20.

The communication module 10 is operable to establish a time-slot based digital radio communication link to a telepoint base station, for providing digital communications via this base station with another mobile station or alternatively with a fixed station as interconnected to a digital telecommunications network.

The controller module 20 is provided for controlling or "governing" operations of respective parts or components of the illustrative mobile station. The controller 20 is typically configured to include a TCH number in this station detecting means 21, a detected TCH number notify control means 22, a TCH number in connected station detection means 23, a communication rate request/instruction reception means 24, and a communication rate switching control means 25.

The TCH number in this station detecting means 21 is arranged to monitor or "watchdog" any receipt signals as sent from a base station presently connected with the communication module 10 for detecting a number of TCH (referred to as "detected TCH number in this station" hereinafter) that is presently assigned by the base station.

The detected TCH number notify control means 22 controls the communication module 10 to set a number of TCH in this station presently detected by TCH number in this station detecting means 21 in a control information region of a data frame shown in FIG. 2, to thereby notify it to a connected mobile station under communication.

The number of TCH in the connected station detection means 23 monitors incoming signals received at the communication module 10 while at the same time monitoring the control information region of a data frame as sent from the connected station under communication, thereby detecting a number of TCH (referred to hereinafter a "TCH number in connected station") being presently assigned by the base station to the aforesaid associative communication station.

The communication rate request/instruction reception means 24 is the one that receives a communication rate switch request as instructed from a control system in the illustrative communication apparatus.

The communication rate switching control means 25 is operatively responsive to the detected TCH number in this station as detected by the TCH number in this station detecting means 21 and the TCH number in the connected station as detected by the TCH number in connected station detecting means 23 plus the above-noted communication rate switch request from a user or subscriber, for appropriately changing or switching the TCH number for use during data communication to thereby perform switching control of the data communication rate.

FIG. 3 is a pictorial representation of status transition of the detected TCH number in this station and the TCH number in the connected station.

As shown herein, the communication rate switching control means 25 is designed to perform the intended communication rate switching control operations in those events that the TCH number in the connected station changes while the deteced TCH number in this station is set at "two (2)" and that the deteced TCH number in this station changes while the TCH number in the connected station is at "2."

A key input module 30 may be a user interface including a keyboard with a plurality of key buttons for use in inputting dial data and in performing user's manual operations concerning message/data transmit-and-receive or "transceive" procedures.

A display unit 31 is provided as a display means for visual indication of several data items as to the communication apparatus to inform the user of such data. Note that the display 31 may alternatively be an audible means for producing audio sounds to inform the user of various data concerned.

Figure 6:
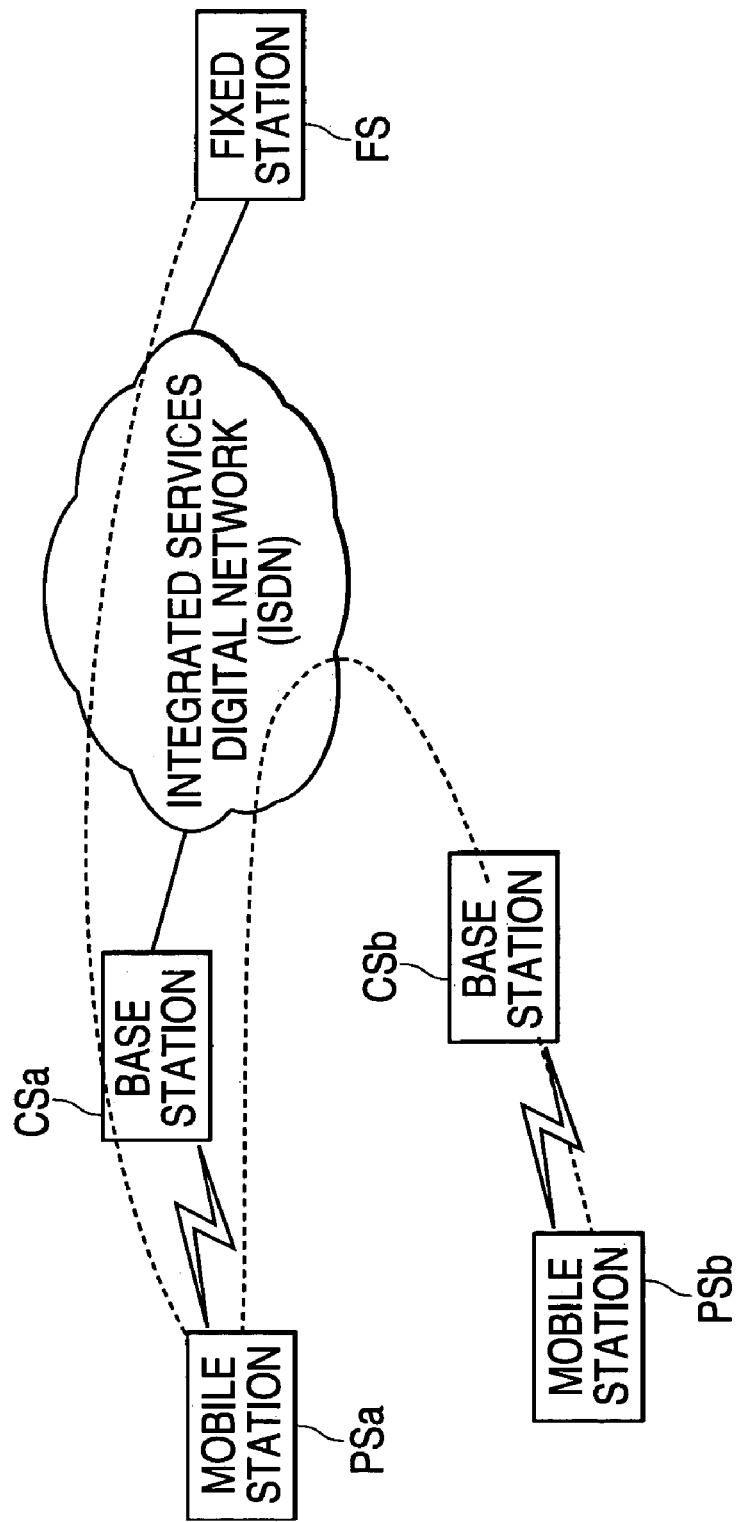
FIG. 6 is a diagram illustrating an overall configuration of a wireless radio-communication system employing the communication apparatus in accordance with this invention.

An operation of the communication apparatus thus arranged will next be explained below. An explanation will first be given of a data communication rate switching control procedure that is responsive, where a PHS mobile station PSa performs data communication with a mobile station PSb as shown in FIG. 6, to generation and extinction of other mobile stations which may attempt to provide communication via a base station CSa to which the mobile station PSa is interconnected by way of an over-the-air radio communication link and a base station CSb to which the mobile station PSb is connected via a radio communication link.

Figure 4B:
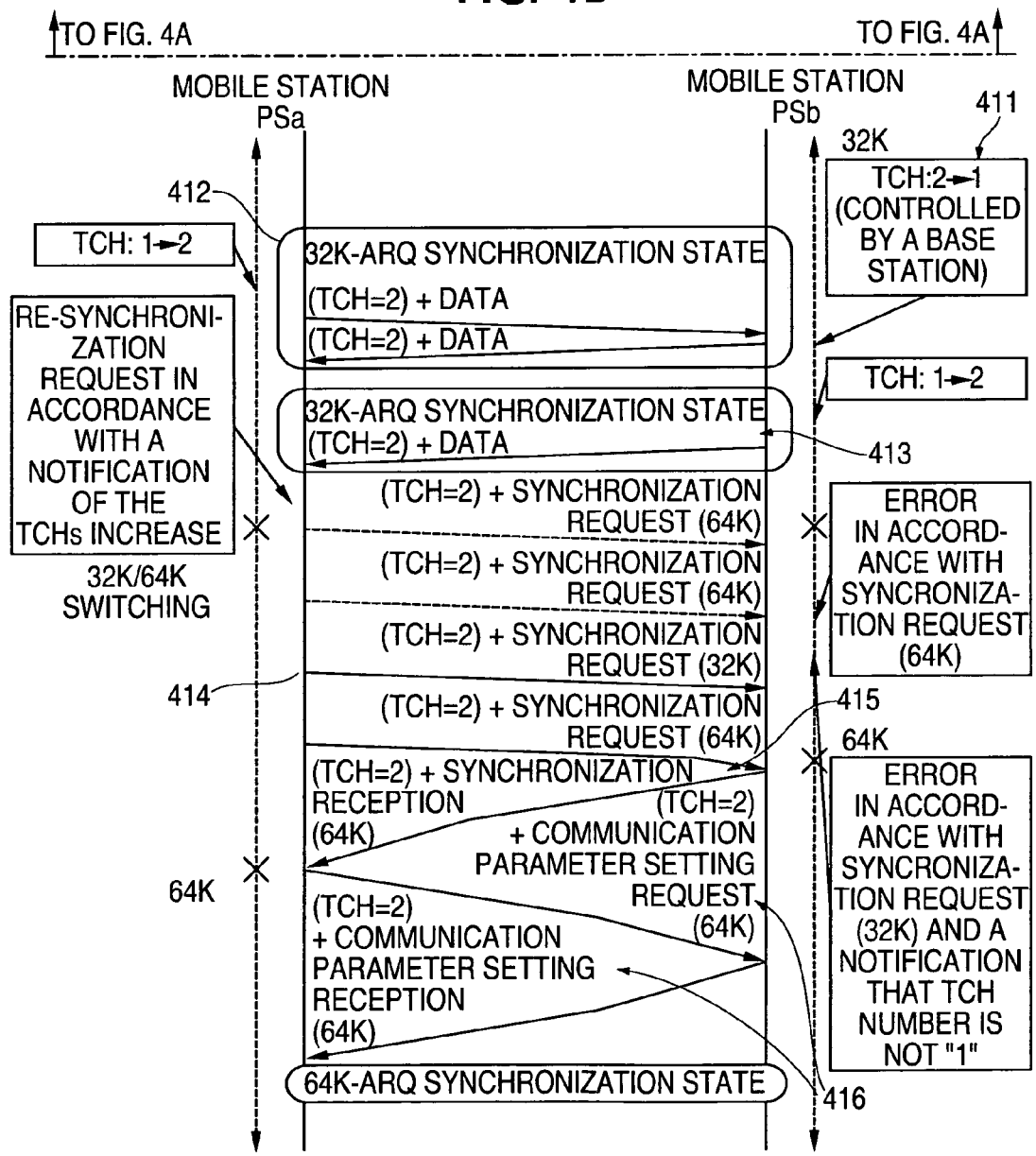

FIGS. 4A and 4B are diagrams showing an operational sequence thereof, FIG. 4B being a continuation of FIG. 4A. It should be noted in FIGS. 4A, 4B, and 5 that an indication "negotiation" refers to negotiation information whereas "parameter" represents parameter information.

In operation of the mobile station PSa, its controller 20 first controls the communication module 10 to issue a telephone call for interconnection to and communication with the destination mobile station PSb by way of the base stations CSa and CSb. In this event, if the base station CSa has two non-use or "idle" TCHs then such two free TCHs will be assigned by the base station CSa to the mobile station PSa.

And, the "calling" mobile station PSa behaves to transmit a data frame toward the "called" mobile station PSb as an action required under a synchronization establishment procedure as pursuant to a selected data communications protocol, which frame contains therein negotiation information and certain information indicative of a request for establishing synchronization of data communication at a rate of 64 kilobits per second (Kbps)(401).

On the other hand, the "called" mobile station PSb waits for arrival of the data frame while letting its own controller 20 control a communication unit 10 to alternately change or switch the data transmit rate between 64 Kbps and 32 Kbps because of the fact that the called station PSb is not aware of which rate is presently adopted for the data frame under the incoming data communication protocol's synchronization establishment procedure to arrive at the station PSb.

In a short time, upon receipt of the data frame at the called mobile station PSb, synchronization is established; when this is done, this station PSb responds to the request contained in the received data frame by sending forth to the calling mobile station PSa specific information along with negotiation information, the former information indicating acceptability of such request for 64-Kbps data communication (402).

Thereafter, the calling mobile station PSa and called station PSb exchange more than one requisite communication parameter therebetween; then, the intended 64-Kbps data communication including error re-send procedure (known as 64K-ARQ data communication) gets started (405).

Note that once after having established such synchronous communication link, the calling mobile station PSa operates in a way which follows.

Its TCH number in this station detecting means 21 detects a number of TCH as assigned by the base station CSa, and then the detected TCH number notify control means 22 sets for transmission the resultant detected the TCH number in this station into the control information region of a data frame to thereby keep the called mobile station PSb notified of any TCH number as presently assigned to the calling station PSa for all time (403).

Similarly, the called mobile station PSb operates as follows: After establishment of the synchronization required, TCH number in this station detecting means 21 detects a number of TCH as assigned by the base station CSb, and then the detected TCH number notify control means 22 sets for transmission the detected TCH number into the control information region of a data frame to thereby constantly notify the calling mobile station PSa of any TCH number as presently assigned to the called station PSb on a real time basis (404).

Before long, a new communication request can be issued by a third party to the base station CSa. If this is the case, the base station CSa acts to adjust the TCH allocation number relative to the mobile station PSa so that it decreases in value to one (1) (406). In responding thereto, the mobile station PSa newly transmits toward the mobile station PSb via the base station CSa an updated data frame containing specific information indicative of a request for synchronization establishment of 32-Kbps data communication (407).

In such event the mobile station PSb must experience failure of synchronization due to the fact that the rate of transmission from the mobile station PSa has been switched to 32 Kbps, which would result in occurrence of an error in continuity of the frame check sequence (FCS) (408). In case this error continues for more than a predetermined time interval, the mobile station PSb operates to switch the communication rate down at 32 Kpbs for receipt of the data frame from the mobile station PSa while also receiving the 32-Kbps data communication synchronization establishment request to establish synchronization accordingly; then, the called station PSb sends forth certain information to the calling mobile station PSa as a response to this request, which information indicates acceptability of the 32-Kbps data communication request (409).

Thereafter, the calling mobile station PSa and called station PSb exchange more than one requisite communication parameter therebetween (410); then, the intended 32-Kbps data communication including error re-send procedure (known as 32K-ARQ data communication) gets started.

During such communication, a new communication request from a third party to the base station CSb can occur resulting in a decrease of the mobile station PSb's assigned TCH number from "2" to "1." (411) At this time the mobile station PSb permits its assigned TCH number notify control means 22 to notify the mobile station PSa of this TCH decrement via the control information region of a data frame.

Suppose that the third party's communication via the base station CSa is thereafter terminated during communication between the mobile stations PSa, PSb. Upon termination of the third party's communication, the TCH being assigned to the mobile station PSa is increased by one (1) up to the value "2," the mobile station PSa lets the assigned TCH number notify control means 22 thereof notify this TCH increment to the mobile station PSb via the control information region of a data frame (412).

At this time the number of idle TCHs between the mobile station PSa and base station CSa has been set at "2"; thus, the intended data communication is available at the rate of 64 Kbps. However, as the mobile station PSa is such that the associative connected station's assigned TCH number detection means 23 has detected the associative station's assigned TCH number as "1" based on the notification from the mobile station PSb at this time, the communication rate switching control means 25 determines that 64-Kbps data communication is impossible and thus hesitate to issue a 64-Kbps synchronization establishment request while continuing 32-Kbps data communication.

Thereafter, upon termination of the third party's communication at the base station CSb, the TCH being assigned to the mobile station PSb is increased by one (1) to become the value "2"; at this time, the mobile station PSb allows the assigned TCH number notify control means 22 thereof to notify this TCH increment to the mobile station PSa via the control information region of a data frame (413).

When this is done, the mobile station PSa operates as follows: The associative station's assigned TCH number detection means 23 detects the above-noted notification causing the communication rate switching control means 25 to control the communication unit 10 for issuing a 64-Kbps synchronization establishment request (414).

On the contrary, as the mobile station PSb has already been notified by the mobile station PSa's assigned TCH number notify control means 22 that the assigned TCH was set at "2," the mobile station PSb's communication rate switching control means 25 performs synchronization establishment at 64 Kbps (415).

It should be noted that although when performing this 64-Kbps synchronization establishment the mobile station PSa and mobile station PSb perform synchronization establishment while simultaneously performing rate switching between 64 and 32 Kbps, these perform synchronization establishment at the rate of 64 Kbps because they mutually recognize that two idle TCHs are present in each associative party under communication.

After having established 64-Kbps synchronization between the mobile station PSa and mobile station PSb in the way discussed above, both of them exchange a required communication parameter(s) therebetween (416); thereafter, they again initiate 64-Kbps data communication including the error re-send procedure (64K-ARQ data communication).

An explanation will next be given of a data communication rate switching control operation in response to receipt of a request from the control system of the mobile station PSa where the mobile station PSa performs data communication with the mobile station PSb. FIG. 5 is a diagram showing the operational sequence thereof.

In operation of the mobile station PSa, its controller 20 first controls the communication module 10 to issue a telephone all for interconnection to and communication with the destination mobile station PSb by way of the base stations CSa and CSb. In this event, if the base station CSa has two non-use or "idle" TCHs then such two free TCHs will be assigned by the base station CSa to the mobile station PSa.

And, the "calling" mobile station PSa behaves to transmit a data frame toward the "called" mobile station PSb as an action required under a synchronization establishment procedure as pursuant to a selected data communications protocol, which frame contains therein negotiation information and certain information indicative of a request for establishing synchronization of data communication at a rate of 64 kilobits per second (Kbps)(501).

In responding thereto, the "called" mobile station PSb waits for arrival of the data frame while letting its own controller 20 control a communication unit 20 to alternately change or switch the data transmit rate between 64 Kbps and 32 Kbps because of the fact that the called station PSb is not aware of which rate is presently adapted for the data frame under the incoming data communication protocol's synchronization establishment procedure to arrive at the station PSb.

In a short time, upon receipt of the data frame at the called mobile station PSb, synchronization is established; when this is done, this station PSb responds to the request contained in the received data frame by sending forth to the calling mobile station PSa specific information along with negotiation information, the former information indicating acceptability of such request for 64-Kbps data communication (502).

Thereafter, the calling mobile station PSa and called station PSb exchange more than one requisite communication parameter therebetween (503); then, the intended 64-Kbps data communication including error re-send procedure (known as 64K-ARQ data communication) gets started.

Assume that the mobile station PSa experiences size reduction of data to be sent, which in turn makes unnecessary any high-speed communication rates which can result in an increase in power dissipation. If this is the case, when a request for dropping the communication rate from 64 Kbps down at 32 Kbps is issued based on an instruction from the control module 10(504), this request will be received and accepted by the communication rate request/instruction reception means 24.

In this event the mobile station PSa operates so that the assigned TCH number notify control means 22 notifies the mobile station PSb of decrement of the assigned TCH number from "2" to "1", thereafter, the communication rate switch control means 25 transmits a data frame that contains information indicative of a request for synchronization establishment of 32-Kbps data communication (505).

In responding, the mobile station PSb performs establishment of synchronization while simultaneously performing rate switching between 64 and 32 Kbps due to the fact that this station is notified from the mobile station PSa that the present value of the assigned TCH number is set at "1"; however, the station actually performs 32-Kbps synchronization establishment because it recognizes the presence of only one TCH as assigned to its associative party's terminal under communication.

After having established the 32-Kbps synchronization between the mobile station PSa and mobile station PSb in the way stated above, both of them exchange a requisite communication parameter(s) therebetween (506); thereafter, they again initiate 32-Kbps data communication including the error re-send procedure (32K-ARQ data communication).

In this way a respective one of the communication apparatuss arranged as described above (mobile stations PSa, PSb) operates to keep its associative party under communication notified of the detected TCH number assigned thereto by a corresponding telepoint base station while at the same time monitoring in any events the associative party's assigned TCH number as presently notified from the associative party's communication terminal to thereby appropriately perform the intended communication rate switching control operations based on these TCH allocation numbers thus obtained.

Accordingly, with the communication apparatus with the above-noted arrangement, it becomes possible to perform accurate communication rate switching operations with enhanced reliability at increased speeds. This can be said because any failure will no longer occur in attempting to switch the communication rate for increase of the rate of communication services by unilaterally increasing the communication-use TCH number up to the value two (2) irrespective of the fact that the TCH number being presently assigned to its associative party's communication terminal is merely at one (1) by way of example. Another advantage lies in an ability to promptly perform the intended communication rate switching operation because of the fact that issuance of a communication rate switching request from the associative party's terminal may be pre-recognizable or predictable based on the notification of a present assigned TCH number from the associative party's terminal under communication.

Additionally, the communication apparatus embodying the invention is specifically arranged to perform, upon receipt of a communication rate switching request at the communication apparatus, a communication rate switching operation so that the resultant rate adequately complies with the aforesaid request after having notified in advance the associative party's terminal of a TCH number corresponding to the switched communication rate satisfying the request, as the TCH allocation number. With such an arrangement, it is possible to quickly perform a communication rate switching operation in response also to a request at the communication apparatus.

It is noted here that although in the illustrative embodiment the communication apparatus has been explained so that its communication rate switching is done in responding to receipt of a request from the control system, the invention should not be limited only to such embodiment and may alternatively be modified, for example, to perform communication rate switching control in reply to the user's instructions in a way such that the user is expected to input his or her communication rate switching request instruction through manual operations of the key-input unit 30 while arranging the controller 20 to receive this instruction for execution of the communication rate switching operation under request.

The communication apparatus is also modifiable so that the display unit 31 visually indicates on its screen a present setup value of the communication rate (32 Kbps or 64 Kbps) at the communication apparatus.

The operability and usability of the communication apparatus may thus be improved by accepting entry of the user's communication rate switching request or by visualizing the communication rate setup state.

Note that this invention should not exclusively be limited to the illustrative embodiment.

Although in the above embodiment one typical variable control of TCH assignment/allocation number in TDMA schemes has been set forth as an example of the technique for control of the communication rate by varying or changing the channel assignment number, similar effects and advantages are also obtainable when applying the inventive teachings to those cases where the communication rate is rendered variable by letting the assignment number of an extended code for use in code division multiple access (CDMA) schemes rather than the TDMA schemes.

Also note that the maximal value of the TCH number used should not be limited to two (2) as in the illustrative embodiment and may be modified to increase beyond this value. Further, the communication rate switching should not be limited to that between 32 and 64 Kbps; an increased rate, such as for example 128 Kbps, may be employed alternatively.

Furthermore, although the embodiment above is illustratively arranged to offer variable communication rate controllability in over-the-air radio communications systems, the same advantages may also be achievable when applying the invention to those cases where variable communication rate control is to be done in wired communications systems.

Still further, although the above embodiment is designed so that the detected TCH number in this station is set into the control information region of the data frame shown in FIG. 2, the number is insertable into any one of other similar suitable regions which are expected to pass this station assignment TCH number to an connected station with delivery failure minimized.

With regard to any other matters concerned, this invention as disclosed and claimed herein may be modified and altered in configuration for use in a wide variety of applications without departing from the true spirit and scope of the invention.

As has been described above, this invention makes it possible to perform variable control of the communication rate in a way adequately complying with both the channel number as assigned by a base station to a this station and the channel number being presently assigned to an connected station by a base station operatively coupled thereto.

Consequently, according to this invention, it is possible to perform any intended communication rate switching operations by precise recognition of a presently available channel assignment number at the associative target party's apparatus, which in turn makes it possible to provide a communication apparatus capable of accurately performing required operations at increased speeds along with communication rate switching methodology for use therein.

What is claimed is:

1. A communication apparatus for communicating over a plurality of channels, the apparatus comprising:
    notifying unit configured to notify a connected another communication apparatus of a number of usable channels based on a negotiation between the communication apparatus and a relay station being connected to the communication apparatus;
    detecting unit configured to detect a number of usable channels based on a negotiation between the connected another communication apparatus and a relay station being connected to the connected another communication apparatus; and
    selecting unit configured to select a communication rate based on the notifying number of usable channels and the detected number of usable channels.

2. The communication apparatus according to claim 1, wherein the selecting unit selects the communication rate based on the notifying number.

3. The communication apparatus according to claim 1, wherein the selecting unit selects the communication rate based on the detected number.

4. The communication apparatus according to claim 1, wherein the notifying unit sets the notifying number of usable channels in control information being transmitted to the connected another communication apparatus.

5. The communication apparatus according to claim 1, wherein the detecting unit detects the number of the channels in control information being received from the connected another communication apparatus.

6. The communication apparatus according to claim 1, wherein the notifying unit notifies the connected another communication apparatus of a number of usable channels set by the communication apparatus.

7. The communication apparatus according to claim 1, wherein the detecting unit detects a number of usable channels assigned by a relay station being connected to the connected another communication apparatus.

8. The communication apparatus according to claim 1, wherein the detecting unit detects a number of usable channels set by the connected another communication apparatus.

9. A method in a communication apparatus for communicating over a plurality of channels, the method comprising:
    notifying a connected another communication apparatus of a number of usable channels based on a negotiation between the communication apparatus and a relay station being connected to the communication apparatus;
    detecting a number of useable channels based on a negotiation between the connected another communication apparatus and a relay station being connected to the connected another communication apparatus; and
    selecting a communication rate based on the notifying number of usable channels and the detected number of usable channels.

10. The method according to claim 9, wherein the communication rate is selected based on the notifying number.

11. The method according to claim 9, wherein the communication rate is selected based on the detected number.

12. The method according to claim 9, wherein the notifying number of usable channels is set in control information being transmitted to the connected another communication apparatus.

13. The method according to claim 9, wherein the detecting number is set in control information being received from the connected another communication apparatus.

14. The method according to claim 9, wherein a number of usable channels assigned by a relay station being connected to the communication apparatus is notified to the connected another communication apparatus.

15. The method according to claim 9, wherein a number of usable channels set by the communication apparatus is notified to the connected another communication apparatus.

16. The method according to claim 9, wherein a number of usable channels assigned by a relay station is detected, the relay station being connected to the connected another communication apparatus.

17. The method according to claim 9, wherein a number of usable channels set by the connected another communication apparatus is detected.

18. The communication apparatus according to claim 1, wherein the notifying unit notifies the connected another communication apparatus of a number of usable channels assigned by a relay station being connected to the communication apparatus.

19. A control unit in a communication apparatus for communicating over a plurality of channels, the apparatus comprising:
notifying unit configured to notify a connected another communication apparatus of a number of usable channels based on a negotiation between the communication apparatus and a relay station being connected to the communication apparatus;
detecting unit configured to detect a number of usable channels based on a negotiation between the connected another communication apparatus and a relay station being connected to the connected another communication apparatus; and
selecting unit configured to select a communication rate based on the notifying number of usable channels and the detected number of usable channels.

20. The control unit according to claim 19, wherein the selecting unit selects the communication rate based on the notifying number.

21. The control unit according to claim 19, wherein the selecting unit selects the communication rate based on the detected number.

22. The control unit according to claim 19, wherein the notifying unit set the notifying number of usable channels in control information being transmitted to the connected another communication apparatus.

23. The control unit according to claim 19, wherein the detecting unit detects the number of the channels in control information being received from the connected another communication apparatus.

24. A communication apparatus for communicating over a plurality of channels, the apparatus comprising:
notifying unit configured to notify a connected another communication apparatus of a first number of usable channels based on a first negotiation between the communication apparatus and a first relay station being connected to the communication apparatus;
detecting unit configured to detect a second number of usable channels based on a second negotiation between the connected another communication apparatus and a second relay station being connected to the connected another communication apparatus; and
selecting unit configured to select a communication rate based on the first number of usable channels and the second number of usable channels.

25. The method of claim 24, wherein the first relay station is the second relay station.

26. A communication apparatus for communicating over a plurality of channels, the apparatus comprising:
obtaining unit configured to obtain a first number of usable channels based on a first negotiation between the communication apparatus and a first base station being connected to the communication apparatus;
obtaining unit configured to obtain a second number of usable channels based on a second negotiation between a connected another communication apparatus and a second base station being connected to the connected another communication apparatus; and
determining unit configured to determine a communication rate based on the first number of usable channels and the second number of usable channels.

27. A communication apparatus for communicating over a plurality of channels via a network, the apparatus comprising:
obtaining unit configured to obtain a first number of usable channels based on a first negotiation between the communication apparatus and a first station of the network, the first station being connected to the communication apparatus;
obtaining unit configured to obtain a second number of usable channels based on a second negotiation between a connected another communication apparatus and a second station of the network, the second station being connected to the connected another communication apparatus; and
determining unit configured to determine a communication rate based on the first number of usable channels and the second number of usable channels.

28. A method for determining a communication rate of a first communication apparatus which communicates with a second communication apparatus at the communication rate, the method comprising:
determining a first number of usable channels between the first communication apparatus and a first base station being connected to the first communication apparatus based on a number of idle channels of the first base station;
determining a second number of usable channels between the second communication apparatus and a second base station being connected to the second communication apparatus based on a number of idle channels of the second base station; and
determining the communication rate based on the first number of usable channels and the second number of usable channels.

29. A communication system in which a first communication apparatus communicates with a second communication apparatus at a communication rate, the system comprising:
determining unit configured to determine a first number of usable channels between the first communication apparatus and a first base station being connected to the first communication apparatus based on a number of idle channels of the first base station;

determining unit configured to determine a second number of usable channels between the second communication apparatus and a second base station being connected to the second communication apparatus based on a number of idle channels of the second base station; and determining unit configured to determine the communication rate based on the first number of usable channels and the second number of usable channels.

30. A communication apparatus for communicating over a plurality of channels, the apparatus comprising:

obtaining unit configured to obtain a first usable data rate based on a first negotiation between the communication apparatus and a first base station being connected to the communication apparatus;

obtaining unit configured to obtain a second usable data rate based on a second negotiation between a connected another communication apparatus and a second base station being connected to the connected another communication apparatus; and determining unit configured to determine a communication rate based on the first usable data rate and the second usable data rate.

31. A communication apparatus for communicating over a plurality of channels via a network, the apparatus comprising:

obtaining unit configured to obtain a first usable data rate based on a first negotiation between the communication apparatus and a first station of the network, the first station being connected to the communication apparatus;

obtaining unit configured to obtain a second usable data rate based on a second negotiation between a connected another communication apparatus and a second station of the network, the second station being connected to the connected another communication apparatus; and determining unit configured to determine a communication rate based on the first usable data rate and the second usable data rate.

32. A method for determining a communication rate of a first communication apparatus which communicates with a second communication apparatus at the communication rate, the method comprising:

determining a first usable data rate between the first communication apparatus and a first base station being connected to the first communication apparatus based on a total data rate of idle channels of the first base station;

determining a second usable data rate between the second communication apparatus and a second base station being connected to the second communication apparatus based on a total data rate of idle channels of the second base station; and determining the communication rate based on the first usable data rate and the second usable data rate.

33. A communication system in which a first communication apparatus communicates with a second communication apparatus at a communication rate, the system comprising:

determining unit configured to determine a first usable data rate between the first communication apparatus and a first base station being connected to the first communication apparatus based on a total data rate of idle channels of the first base station;

determining unit configured to determine a second usable data rate between the second communication apparatus and a second base station being connected to the second communication apparatus based on a total data rate of idle channels of the second base station; and determining unit configured to determine the communication rate based on the first usable data rate and the second usable data rate.

* * * * *